United States Patent
Ketz et al.

(10) Patent No.: US 9,877,472 B2
(45) Date of Patent: Jan. 30, 2018

(54) HUNTING STAND

(71) Applicants: Patrick Allen Ketz, Ortonville, MN (US); Owen Gregory Rude, Montevideo, MN (US)

(72) Inventors: Patrick Allen Ketz, Ortonville, MN (US); Owen Gregory Rude, Montevideo, MN (US)

(73) Assignee: Mama Liz, LTD, Ortonville, MN (US)

( * ) Notice: Subject to any disclaimer, the term of this patent is extended or adjusted under 35 U.S.C. 154(b) by 0 days.

(21) Appl. No.: 15/197,056

(22) Filed: Jun. 29, 2016

(65) Prior Publication Data

US 2018/0000063 A1     Jan. 4, 2018

(51) Int. Cl.
    *A01M 31/02*    (2006.01)
    *A01M 31/00*    (2006.01)
    *E06C 1/39*     (2006.01)

(52) U.S. Cl.
    CPC .......... *A01M 31/02* (2013.01); *A01M 31/006* (2013.01); *A01M 31/025* (2013.01); *E06C 1/39* (2013.01)

(58) Field of Classification Search
    CPC ............................ A01M 31/02; A01M 31/025
    See application file for complete search history.

(56) References Cited

U.S. PATENT DOCUMENTS

| | | | |
|---|---|---|---|
| 3,220,766 A | 11/1965 | Kates | |
| 4,696,374 A * | 9/1987 | Hale | A01M 31/02 182/127 |
| 5,371,966 A * | 12/1994 | Hall | A01M 31/00 135/117 |
| 5,409,081 A * | 4/1995 | Reeves | A01M 31/02 182/116 |
| 5,485,978 A * | 1/1996 | Hernandez | A01M 31/02 182/151 |
| 6,948,587 B2 | 9/2005 | Griffiths | |
| 7,984,789 B2 * | 7/2011 | Michalec | A01M 31/02 182/115 |
| 8,256,794 B1 | 9/2012 | Burton et al. | |
| 9,033,105 B1 * | 5/2015 | Boswell | A01M 31/025 182/115 |
| 9,091,087 B2 * | 7/2015 | Watford | E06C 1/28 |
| 9,259,094 B1 * | 2/2016 | McCauley | A47C 17/64 |
| 2003/0042075 A1 * | 3/2003 | Bench | A01K 97/10 182/115 |

(Continued)

*Primary Examiner* — Colleen M Chavchavadze
(74) *Attorney, Agent, or Firm* — Dunlap Bennett & Ludwig PLLC

(57) ABSTRACT

A hunting stand is provided. A frame assembly includes a plurality of legs and a plurality of struts. A platform includes a pair of wheel spindles each extending from laterally from an opposing side of the platform. A seat is secured to an upper surface of the platform. The hunting stand includes an assemble position and a transport position. The assemble position includes the legs and struts of the frame assembly attached together in an upright position elevating the platform, and a top end of the ladder is secured to and extending downward from the platform in a vertical position. The transport position includes the legs and struts detached from one another, the pair of wheels secured to the pair of wheel spindles respectively and the top end of the ladder secured to and extending laterally from the platform in a horizontal position.

12 Claims, 4 Drawing Sheets

(56) References Cited

U.S. PATENT DOCUMENTS

2004/0195042 A1* 10/2004 Smith .................. A01M 31/02
                                                182/127
2005/0224288 A1   10/2005 Chesness et al.
2007/0089929 A1*  4/2007 Schriewer ............ A01M 31/02
                                                182/127
2012/0000498 A1*  1/2012 Shih .................... E04H 15/04
                                                135/96
2015/0167325 A1   6/2015 Watford

* cited by examiner

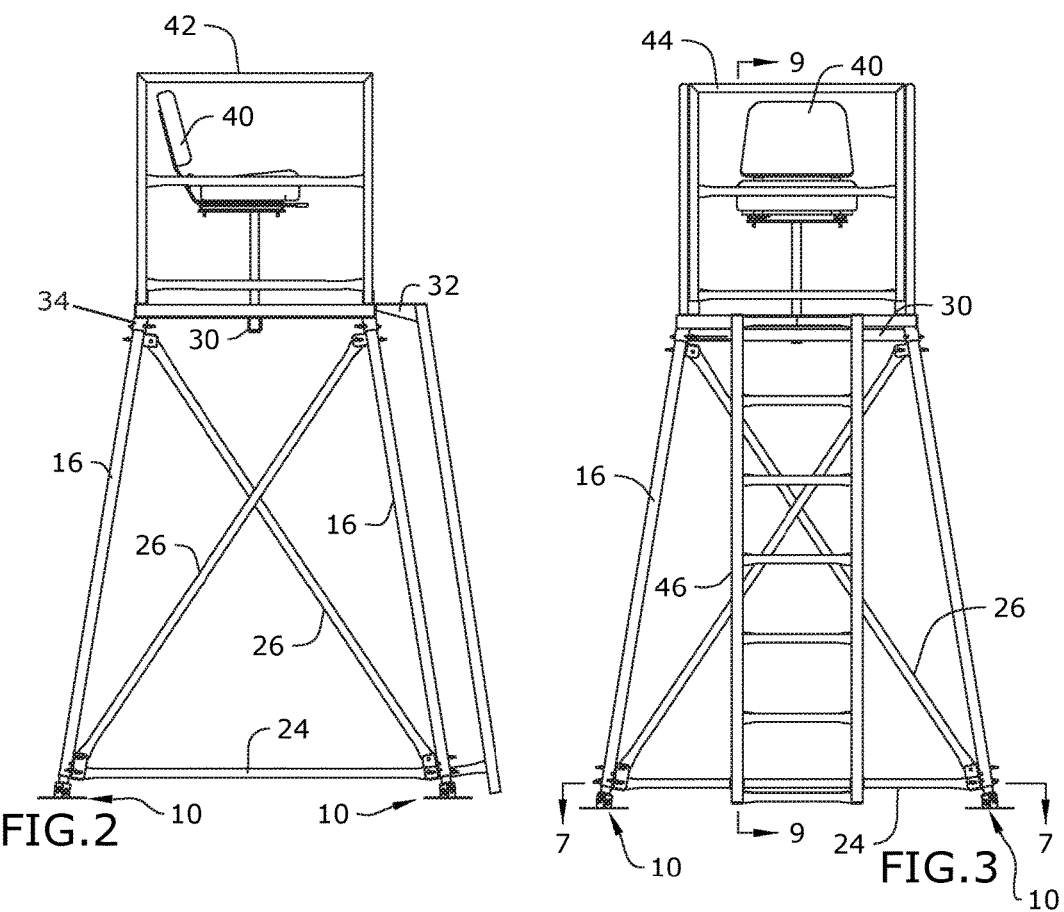
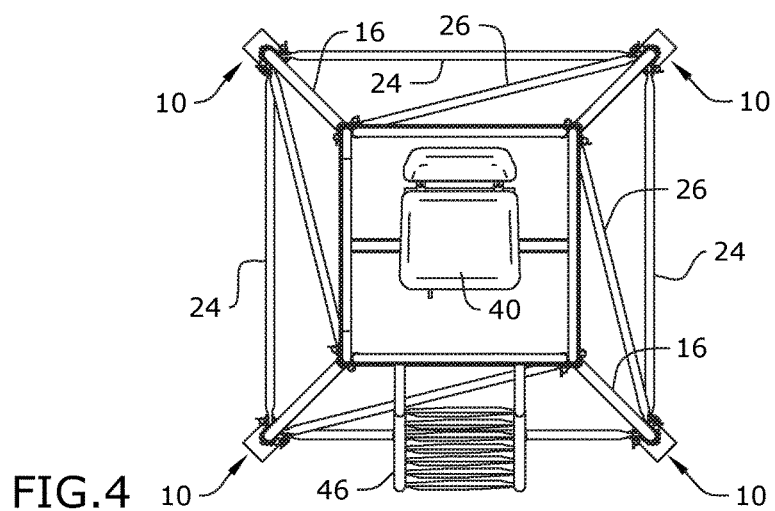

HUNTING STAND

BACKGROUND OF THE INVENTION

The present invention relates to a hunting stand and, more particularly, to a modular portable hunting stand.

Deer stands are open or enclosed platforms used by hunters. The platforms are secured to trees or supported by a frame in order to elevate the hunter and give him or her a better vantage point. Most hunting stands either require a tree for bracing or are not easily movable. The current stands are either too heavy or require tools to disassemble and reassemble.

As can be seen, there is a need for an improved hunting stand that easily assembles and disassembles.

SUMMARY OF THE INVENTION

In one aspect of the present invention, a hunting stand comprises: a frame assembly comprising a plurality of legs and struts; a platform comprising a pair of wheel spindles each extending laterally from an opposing side of the platform; a ladder; a pair of wheels; and a seat secured to an upper surface of the platform, wherein the hunting stand comprises an assemble position and a transport position, the assemble position comprising the legs and struts of the frame assembly attached together in an upright position elevating the platform, and a top end of the ladder secured to and extending downward from the platform in a vertical position; the transport position comprising the legs and struts detached from each other, the pair of wheels secured to the pair of wheel spindles respectively and the top end of the ladder secured to and extending laterally from the platform in a horizontal position.

These and other features, aspects and advantages of the present invention will become better understood with reference to the following drawings, description and claims.

BRIEF DESCRIPTION OF THE DRAWINGS

FIG. 2 is a side view of an embodiment of the present invention in an assemble position;

FIG. 3 is a front view of an embodiment of the present invention in an assemble position;

FIG. 4 is a top view of an embodiment of the present invention in an assemble position;

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a portable free standing hunting stand that transforms into a portable game cart. The present invention does not need a tree for support. The present invention can be assembled without the use of tools. Further, the present invention may include adjustable legs for ease of leveling on uneven ground.

Figure 1:
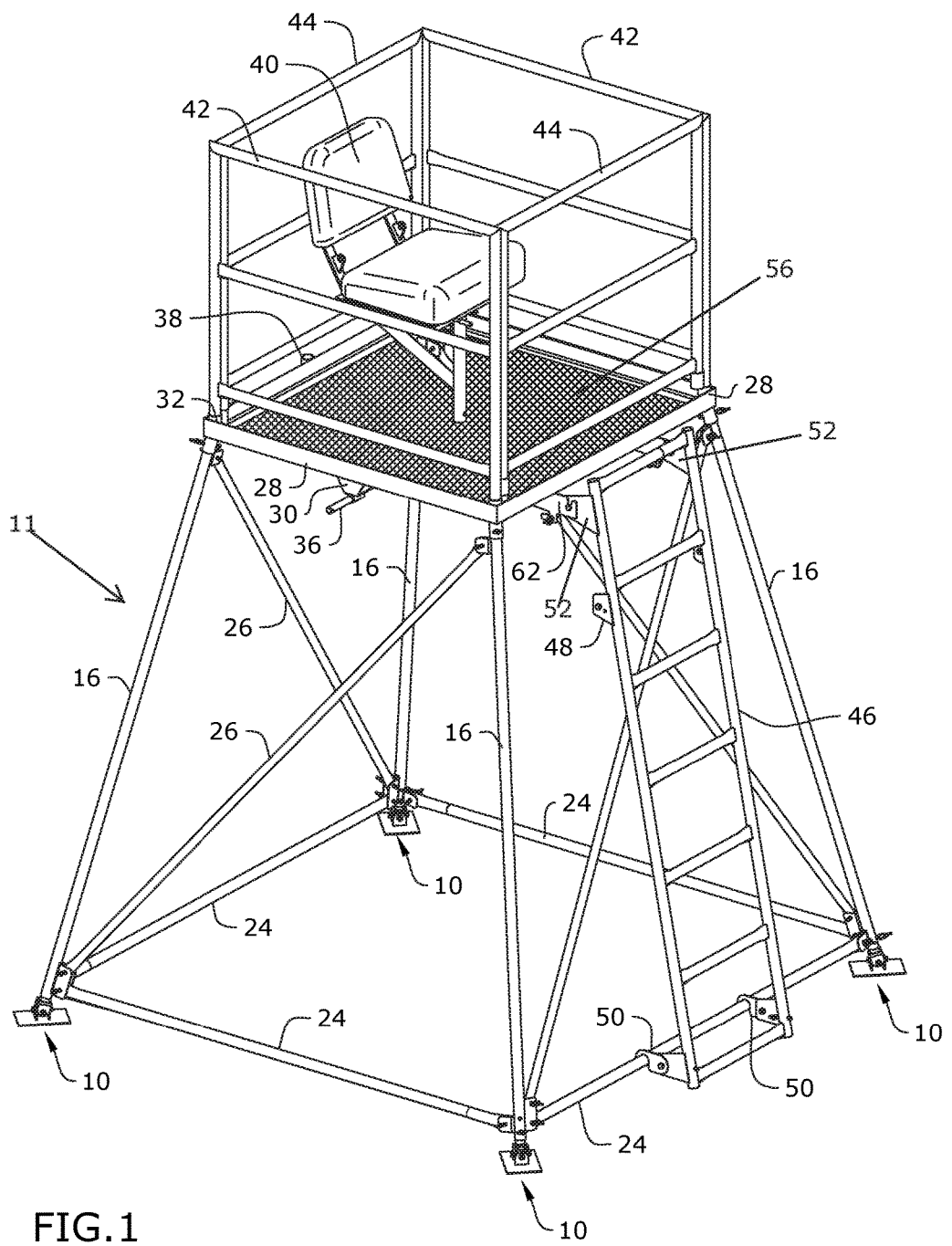
FIG. 1 is a perspective view of an embodiment of the present invention in an assemble position.
Figure 5:
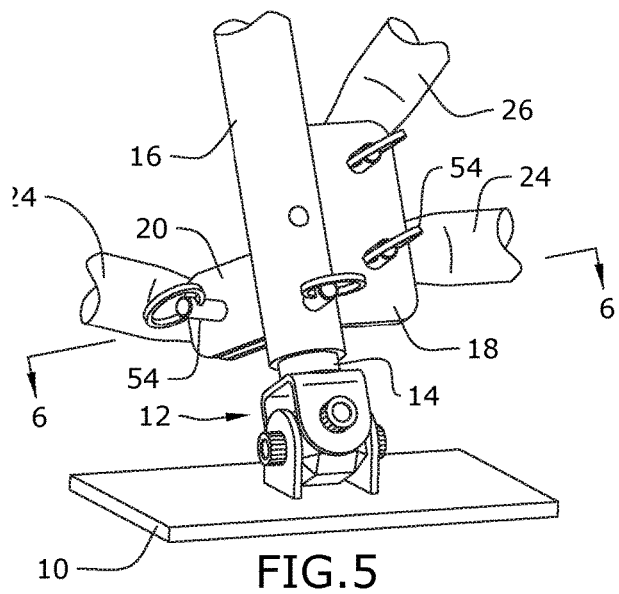
FIG. 5 is a detail perspective view of an embodiment of the present invention.
Figure 6:
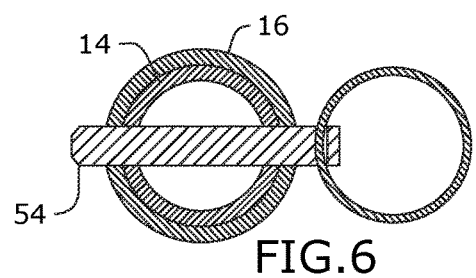
FIG. 6 is a detail section view taken along line 6-6 in FIG. 5.
Figure 7:
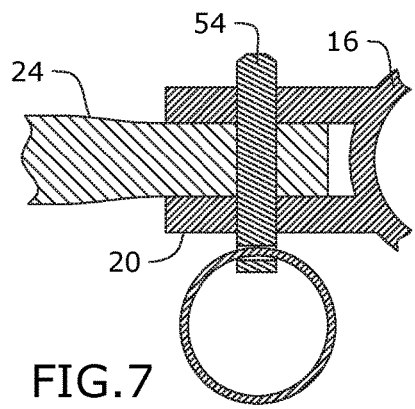
FIG. 7 is a detail section view taken along line 7-7 in FIG. 3.
Figure 8:
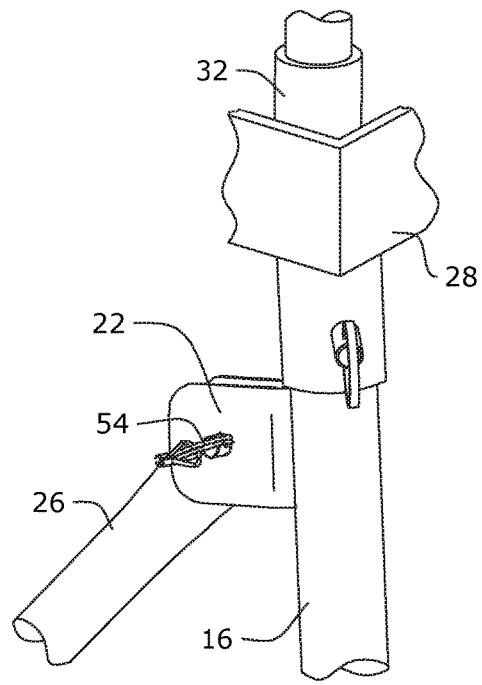
FIG. 8 is a perspective detail view of an embodiment of the present invention.
Figure 9:
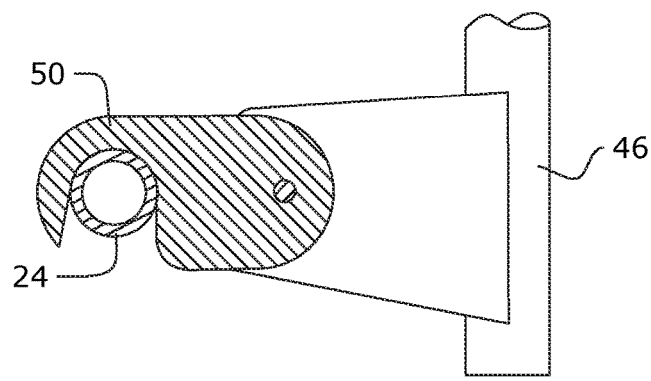
FIG. 9 is a section detail view of an embodiment of the present invention.
Figure 10:
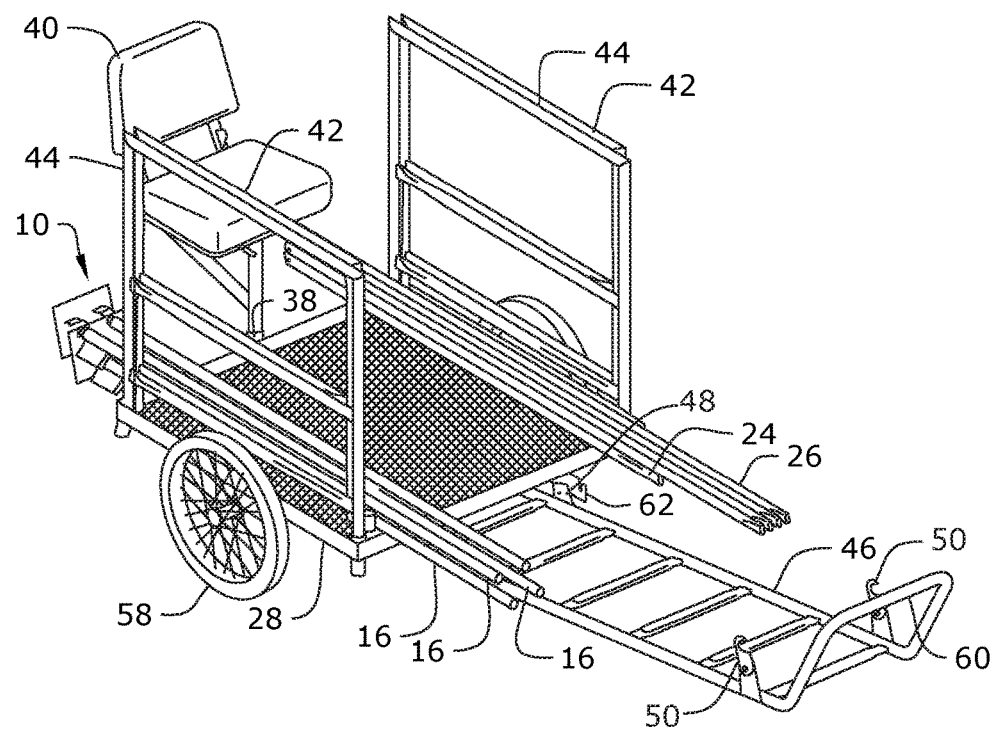
FIG. 10 is a perspective view of an embodiment of the present invention in a transport position.

Referring to FIGS. 1 through 9, the present invention includes a hunting stand. The hunting stand includes a frame assembly 11, a platform 56, a ladder 46, a pair of wheels 58, and a seat 40. The frame assembly 11 includes a plurality of legs 16 and a plurality of struts 24. The platform 56 includes a pair of wheel spindles 36 each extending laterally from an opposing side of the platform 56. The seat 40 is secured to an upper surface of the platform 56. The hunting stand includes an assemble position and a transport position. The assemble position includes the legs 16 and struts 24 of the frame assembly 11 attached together in an upright position elevating the platform 56, the first wheel spindle and the second wheel spindle disposed along a horizontal axis, and a top end of the ladder 46 secured to and extending downward from the platform 56 in a vertical position. The transport position includes the legs 16 and struts 24 detached from one another, the pair of wheels 58 secured to the pair of wheel spindles 36 respectively and the top end of the ladder 46 secured to and extending laterally from the platform 56 in a horizontal position.

The plurality of legs 16 of the frame assembly 11 may be disposed vertically and the plurality of struts 24 may be disposed horizontally connecting the plurality of legs 16 together in the assemble position. A plurality of braces 26 may be use for additional support. The braces 26 may secure to a bottom end of one of the legs 16 to a top end of another leg 16. In certain embodiments, foot plates 10 may be attached to bottom of the legs 16 by a swivel assembly 12. The swivel assembly 12 allows the feet 10 to pivot about an x and y axis. The swivel assembly 12 may be attached to the legs 16 by a telescoping tube 14 so that the legs 16 are adjustable in length. Each of the legs 16 may include a strut brace clip 18 near the bottom end, a strut clip 20 near the bottom end, and a brace clip 22 near the top end. The struts 24 may be connected to strut clips 20 and strut brace clip 18 by quick pins 54. The braces 26 may be connected to the brace clips 22 and strut brace clips 18 by quick pins 54. In certain embodiments, the ends of the struts 24 and the braces 26 may be substantially narrow and may fit in between two plates of the strut brace clip 18, the strut clip 20 and the brace clip 22. The quick pins 54 may fit within aligning openings connecting the frame assembly 11 together.

The platform 56 may include a substantially flat and sturdy plate. The platform 56 may be made of a metal mesh, wood or the like. A frame angle 28 may be disposed about the perimeter of the platform 56. In certain embodiments, a seat mount tube 30 may be disposed at a central portion and a seat transport socket 38 may be disposed at an edge. The seat 40 is secured within the seat mount tube 30 in the assemble position and the seat transport socket 38 in the transport position. The platform 56 may include side handrails 42 secured to sides of upper surface of platform 56. Handle rail sockets 32 may be formed adjacent to the side handrail assembly 42 and receive the front and back handrails 44, which completely encloses the platform with handrails 42, 44. The platform 56 may further include leg sockets 34 disposed at corners of the lower surface. The leg sockets 34 receive top ends of the legs 16 in the assemble position. Quick pins 56 may fit through aligning openings formed through the leg sockets 34 and the top ends of the legs 16 to secure the frame assembly 11 to the platform 56. The platform 56 may further include a ladder mount plate 62 disposed at front end.

The ladder 46 may include a standard ladder having a top end and a bottom end. The ladder 46 may include a ladder connector 52 disposed at the top end and a transport connector 48 in between the top end and a bottom end. In certain embodiments, the transport connector 48 may be disposed near the top end and may extend from an inner edge. The ladder connector 52 is releasably coupled to the ladder mount plate 62 of the platform 56 in the assemble position and the transport connector 48 is releasably coupled to the ladder mount plate 62 in the transport position. In certain embodiments, the ladder mount plate 62 may include a slot and the ladder connector 52 and the transport connector 48 may each include a headed pin that fits within the slot and is retained to the ladder mount plate 62. The ladder 46 may further include a pair of bottom hooks 50 pivotally secured to brackets extending from the bottom end. The bottom hooks 50 secure to one of the struts 24 of the frame assembly 11 in the assemble position.

In the assemble position, the legs 16, struts 24, and braces 26 form a stable structure that carries the platform 56. The legs 16 may be interchangeable, as well as all struts 24, and braces 26. This allows any leg 16 to be used in any leg position, any strut 24 to be used in any strut position, and any brace 26 to be used in any brace position, thus making part selection for assembly easy. The legs 16 have a swiveling footplate 10 and an extensible lower section to accommodate uneven ground conditions. The platform 56 may be square so that the legs 16, struts 24 and braces 26 can be attached in any of four rotations of the platform 56. The platform 56 may have a defined front, as this is the side where the ladder 46 is positioned. The ladder 46 secures to the platform 56. The platform 56 has sockets to plug in the side handrails 42. The side handrails 42 have sockets to plug in the front and back handrails 44. Cloth cases cover the handrails 42, 44, providing cover for the hunter. The front and back handrails 44 may be lifted and swung out like a door to enter or exit the hunting stand. The platform 56 also has a centrally located seat mount tube 30 to attach the seat 40. The seat 40 rotates in this in the seat mount tube 30 to provide the hunter an unobstructed 360 degree field of view. The seat 40 may be offset to provide maximum leg room in any rotation. When transporting the stand, the ladder 46 is used to form a draw-bar for the platform 56. A detachable handle 60 attaches to the bottom of the ladder 46 to allow the hunter to push or pull the disassembled stand. Wheels 58 attach to spindles 36 that are welded to the platform 56. Legs 16, struts 24 and braces 26 are loaded on the platform. The seat 40 is attached into the seat transport socket 38 at the rear of the platform. This arrangement allows sufficient space to transport harvested game.

It should be understood, of course, that the foregoing relates to exemplary embodiments of the invention and that modifications may be made without departing from the spirit and scope of the invention as set forth in the following claims.

What is claimed is:

1. A hunting stand comprising:
   a frame assembly comprising a plurality of legs and struts;
   a platform comprising a flat upper surface having a first side, a second side opposite the first side, a front side and a rear side opposite the front side, wherein a first wheel spindle is laterally extending from the first side and a second wheel spindle is laterally extending from the second side;
   a ladder; and
   a pair of wheels, wherein
   the hunting stand is configured to be arranged in an assemble position and a transport position,
   the assemble position comprising the legs and struts of the frame assembly attached together in an upright position elevating the platform with the flat upper surface in a horizontal position with the first wheel spindle and the second wheel spindle disposed along a horizontal axis, and a top end of the ladder secured to the platform in a vertical position;
   the transport position comprising the legs and struts detached, the pair of wheels secured to the first and second wheel spindles respectively and the top end of the ladder secured to the platform in a horizontal position.

2. The hunting stand of claim 1, wherein the plurality of legs are disposed vertically and the plurality of struts are disposed horizontally connecting the plurality of legs together in the assemble position.

3. The hunting stand of claim 2, wherein each of the plurality of legs comprises a foot plate attached to a bottom end by a swivel assembly.

4. The hunting stand of claim 3, wherein each of the plurality of legs are telescopic and adjust in length.

5. The hunting stand of claim 1, wherein the ladder further comprises a ladder connector at the top end and a transport connector in between the top end and a bottom end.

6. The hunting stand of claim 5, wherein the ladder connector is coupled to a ladder mount plate of the platform in the assemble position and the transport connector is coupled to the ladder mount plate in the transport position.

7. The hunting stand of claim 5, wherein the ladder further comprises at least one bottom hook secured to one of the struts disposed near a bottom portion of the frame assembly in the assemble position.

8. The hunting stand of claim 1, wherein the platform further comprises a plurality of leg sockets sized to receive and secure top ends of the plurality of legs within in the assemble position.

9. The hunting stand of claim 1, further comprising at least one hand rail secured to and extending from the upper surface of the platform.

10. The hunting stand of claim 1, further comprising a seat secured to the flat upper surface of the platform.

11. The hunting stand of claim 10, wherein the platform further comprises a seat mount tube disposed at a central portion and a seat transport socket disposed near an edge, wherein the seat is secured within the seat mount tube in the assemble position and the seat transport socket in the transport position.

12. A hunting stand comprising:
    a frame assembly comprising a plurality of legs and struts;
    a platform comprising a ladder mount plate and a pair of wheels spindles, each of the wheels spindles extending laterally from opposing sides of the platform;
    a ladder comprising a ladder connector at the top end and a transport connector in between the top end and a bottom end; and
    a pair of wheels, wherein
    the hunting stand is configured to be arranged in an assemble position and a transport position,
    the assemble position comprising the legs and struts of the frame assembly attached together in an upright position elevating the platform, and the ladder connector secured to the ladder mount plate of the platform in a vertical position;

the transport position comprising the legs and struts detached, the pair of wheels secured to the pair of wheel spindles respectively and the transport connector secured to the ladder mount plate of the platform in a horizontal position.

\* \* \* \* \*